(No Model.)

C. J. BROSNAN.
BICYCLE WHEEL LOCK.

No. 473,867.  Patented Apr. 26, 1892.

Witnesses:
J. L. Garfield
T. F. Denum

Inventor:
C. J. Brosnan
per Chapin & Co.
Attys

UNITED STATES PATENT OFFICE.

CORNELIUS J. BROSNAN, OF SPRINGFIELD, MASSACHUSETTS, ASSIGNOR OF THREE-FIFTHS TO FRANK M. COE, HENRY A. CHAPIN, AND LYMAN W. BESSE, OF SAME PLACE.

BICYCLE-WHEEL LOCK.

SPECIFICATION forming part of Letters Patent No. 473,867, dated April 26, 1892.

Application filed January 27, 1892. Serial No. 419,384. (No model.)

*To all whom it may concern:*

Be it known that I, CORNELIUS J. BROSNAN, a citizen of the United States, residing at Springfield, in the county of Hampden and State of Massachusetts, have invented new and useful Improvements in Bicycle-Wheel Locks, of which the following is a specification.

The object of this invention is to provide a bicycle-lock of improved construction. This lock is designed to be applied on the fork of the bicycle and to have a bolt, which may be shot at right angles to the length of the fork, for a locking engagement between the spokes of the wheel. In addition to the efficiency and availability of the lock, a prominent purpose of the invention is to devise a construction which is of unusual simplicity, readily permitting the manufacture by machinery of the parts, and the easy assemblage of the parts.

The invention consists in constructions and combinations of parts, all substantially as will hereinafter fully appear, and be set forth in the claims.

In the accompanying drawings the construction of the lock and the manner of its application upon a bicycle is shown.

Figure 1:
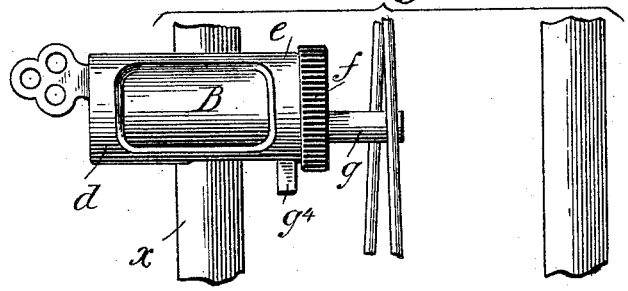
Figure 3:
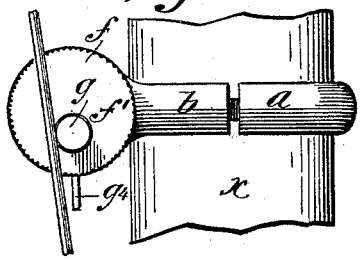
Figure 2:
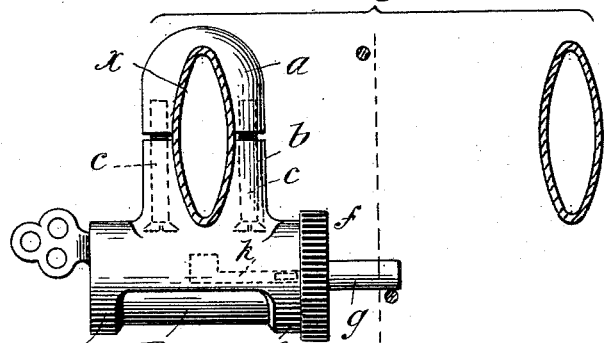
Figure 4:
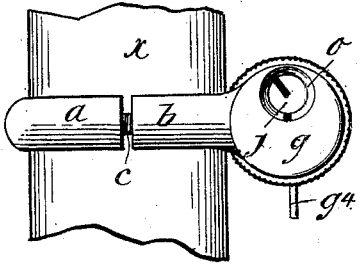
Figure 5:
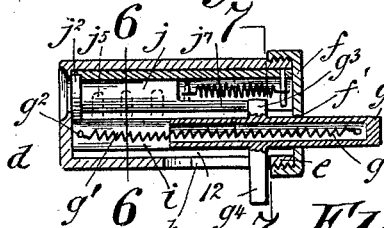
Figures 6, 7, 8:
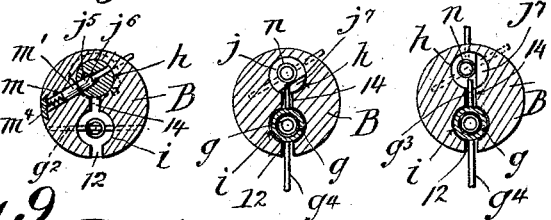
Figure 9:
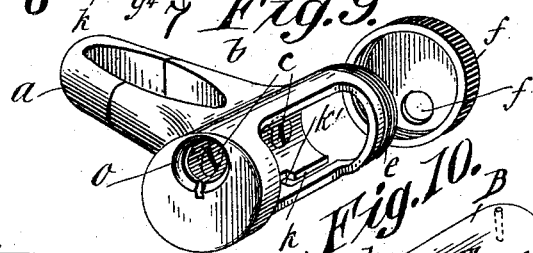
Figure 10:
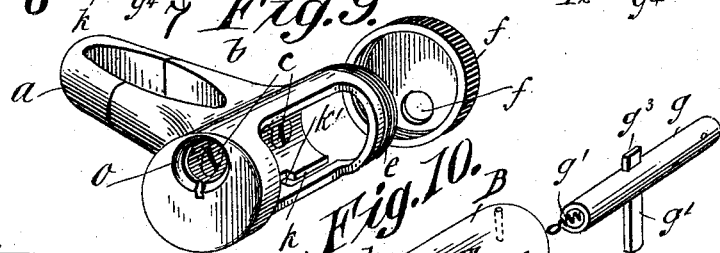

Figure 1 is an elevation of the lock applied on a fork-leg of the machine, with its bolt projected between the wheel-spokes. Fig. 2 is a plan view of the lock and horizontal section of the parts of the bicycle with which it coacts. Figs. 3 and 4 are views at different ends of the bicycle-lock. Fig. 5 is substantially a central longitudinal vertical section through the lock. Figs. 6 and 7 are cross-sections taken, respectively, on the line 6 6 and 7 7 of Fig. 5 of the lock-body, the lock support or casing not being shown. Fig. 8 is a similar section to Fig. 7, but showing the changed position of the tumbler-bar to permit of the withdrawal of the bolt from its locking projection. Fig. 9 is a perspective view of the lock-case and the attachment-clip, the lock-body and working parts being removed, while in Fig. 10 the said working parts of the lock are shown in perspective as separated from each other.

In the drawings, $a$ and $b$ indicate the two parts of a clip for encircling the bicycle-fork leg. The said clip parts are united to clamp the fork-leg $x$ by the screws $c\ c$, the heads of which are covered and concealed by the cylindrical body B when the latter is in place. The part $b$ of the clip is formed for the reception and support of the cylinder by having the outer face thereof concave for the greater portion of its length; but at its one extremity it has the socketed head $d$ and at its other extremity the annular externally screw-threaded portion $e$. The cylinder is confined against movement and endwise displacement by the screw-cap $f$, the latter having therein the hole $f'$ for the passage therethrough of the bolt $g$. The said cylinder has the two parallel holes $h$ and $i$, which are bored from end to end, the hole $h$ constituting a socket for the disposition therein of the tumbler-bar $j$ and coacting parts to be shortly mentioned, while the hole $i$ is for the reception and endwise movement therein of the said bolt $g$. A slot 12 is formed through the under side of the cylinder leading to the longitudinal hole $i$, and another slot 14 is formed between and connects the holes $h$ and $i$. The bolt $g$ is preferably formed tubular for receiving therein a portion of the retracting-spring $g'$, which spring has its forward end connected to a forward portion of the bolt and its rear end secured to the cross-pin $g^2$, which traverses the rear end of the hole $i$. The bolt has intermediately thereof the lug $g^3$, which extends upwardly through the slot 14 for a short distance within and transversely of the hole $j$, and also has the thumb-lug $g^4$, which extends downwardly through and below the slot 12 in the cylinder and is adapted to have a bayonet-joint form of engagement with the angularly-formed slot $k$ in the under side of the casing. The tumbler-bar $j$ has its head $j^2$ set in the countersunk opening $j^3$ in the end of the cylinder, opposite which head is the opening $o$ through the head of the lock-support. The tumbler-bar has the key-slot $j^4$ and transversely thereof, extending from its side opposite the slot and to intersect the latter, the holes $j^5\ j^5\ j^5$, which are for the reception of the set of tumbler-pins $j^6$, the lengths of the latter being variable, as desired, and all somewhat less than the depths of the receiving-holes therefor. The cylinder is provided with a like series of pin-receiving holes $m$, having therein the tumbler-pins $m'$, outside of which are the inwardly-forcing springs $m^2$. A dovetailed way $m^3$ is formed in the side of the cylinder along the orifices of the said tumbler-pin-receiving holes, in which is fitted the retaining-piece $m^4$. The inner end portion of the tumbler-bar $j$ is formed narrow or of less area than the socket $h$, as shown at $j^7$, which narrow part constitutes the engaging dog for engagement with the catch-lug $g^3$ of the bolt when the bolt is shot and said portion $j^7$ is properly turned therefor; but on otherwise turning the tumbler-bar the flattened engagement portion may be swung into the position relative to the catch-lug indicated in Fig. 8, leaving the bolt subject to the retracting action of its spring $g'$.

The spring $n$ is applied for a torsional action on the tumbler-bar, serving, when the catch-lug $g^3$ is slid forward with the bolt beyond the end of the bar, to partially rotate the bar, which places it in its bolt-retaining position and also brings the two sets of tumbler-pins into registry, effecting the locking of the tumbler-bar and rendering the withdrawal of the bolt possible only by the employment of the key. When the bolt is withdrawn, it is held against accidental forward projection by being given a slight rotational movement to swing the thumb-lug laterally into engagement with the portion $k'$ of the bayonet-joint slot in the lock-support. When the bolt is withdrawn, the tumbler-pins are out of engagement with tumbler-bar, the catch-lug $g^3$ lying across an intermediate portion of the tumbler-bar and ready at any time to be forced forward to be automatically locked. The locking may therefore be accomplished in a moment, the unlocking requiring, as before intimated, the possession of the properly-fitted key and the time necessary for its manipulation.

An observance of the described construction and an inspection of the design of the parts shown in the drawings will make manifest, particularly to a machinist or metal-worker, that for the production of large quantities of the lock-constituting parts automatic machinery may be largely employed, it being possible to use to a large extent plain bar metal, working it by drilling, milling, and slotting, and drop-forging, and hence the cost of production becomes minimized.

Having thus described my invention, what I claim, and desire to secure by Letters Patent, is—

1. In a lock for a bicycle, in combination, a lock-body having therein a boltway and a socket and supporting and attachment devices for mounting said body on the bicycle, a bolt movable endwise in said way and provided with a catch-lug which is extended partially across the socket, a member adapted to have a rotational movement in said socket and having an abutment portion which but partially fills the socket, and which may be turned to impede the catch-lug or to permit the longitudinal movement thereof, locking devices for maintaining the said member against its rotational movement, and a spring for effecting the rotational movement of said member at the time of the disengagement of its locking device, substantially as described.

2. In a lock for a bicycle, in combination, a lock-body having therein a boltway and a socket and supporting and attachment devices for mounting said body on the bicycle, a bolt movable endwise in said way and provided with a catch-lug which is extended partially across the socket and having the thumb-lug extended to the exterior of the lock-body, a member adapted to have a rotational movement in said socket and having an abutment portion which but partially fills the socket and which may be turned to impede the catch-lug or to permit the longitudinal movement thereof, locking devices for maintaining the said member against its rotational movement, and a spring for effecting the rotational movement of said member at the time of the disengagement of its locking device, and the retracting-spring for the bolt, substantially as described.

3. The combination, with the two-part clip, one member thereof having a supporting-casing for a lock-body, provided with a bayonet-joint slot on its under side, of a lock-body having the parallel holes $h$ and $i$, with the uniting-slot 14 and the slot 12, and having the holes $m$ $m$ therein and the spring-pressed pins, the tumbler-bar set for rotation in said hole $h$, having the narrowed extremity $j^7$ and the pin-holes and tumbler-pins therein, the tumbler-bar-rotating spring and the key-slot, the bolt endwise movable in the hole $i$, having the catch-lug $g^3$ extended through said slot 14 and partially across said hole $h$, the bolt also having a thumb-lug extended through the slot 12 and said casing-slot, and the bolt-retracting spring, arranged for operation substantially as described.

4. In a bicycle-lock, the combination, with a two-part clip, one member thereof having a supporting-casing, provided with a head at one end having the opening $o$, and having a removable screw-cap $f$ at its other end and an opening through its under part, of the cylindrical lock-body having the socket and boltway and the tumbler-bar $j$, having the narrowed abutment-extremity $j^7$, the rotating spring and the tumbler-pins coacting between the tumbler-bar and said cylindrical body, the bolt movable endwise in the hole $i$, having the catch-lug $g^3$, and the thumb-lug $g^4$, and a retracting-spring therefor, said elements and features of construction being arranged and formed for conjoint action substantially as described.

5. In a bicycle-lock, the combination, with a two-part clip, one member thereof being formed to constitute a lock holder or casing, of a cylindrical lock-body supported and confined in said casing and having a tumbler-bar socket and a boltway therein, and a series of holes transversely extending from the exterior of the lock-body to said socket and having the dovetailed way formed at the exterior of said body, intersecting the orifices of said holes, tumbler pins and springs in said holes, and the dovetailed slide-piece $m^4$, the tumbler-bar in said socket having registering holes and tumbler-pins and a key-slot, and the bolt endwise movable in said way, having a catch-lug adapted to be engaged by said tumbler-bar, substantially as described.

6. The combination, with the fork-leg of a bicycle, of a clip for engaging same, having a lock-body with a boltway and a bolt therein, which is movable in a straight line at right angles to the length of the fork-leg for projection between the wheel-spokes, a movable locking device inclosed within the lock-body for holding the bolt in its locking projection, and a thumb-lug $g^4$, projected from the bolt through a slideway, which is longitudinally formed therefor through the lock-body, whereby when the bolt is within the lock-body it may be forced into the spoke-engaging projection, substantially as described.

CORNELIUS J. BROSNAN.

Witnesses:
H. A. CHAPIN,
WM. S. BELLOWS.